(12) United States Patent
Shah et al.

(10) Patent No.: US 6,359,610 B1
(45) Date of Patent: *Mar. 19, 2002

(54) WIRELESS INTERFACE SYSTEM FOR ALLOWING A PLURALITY OF INPUT DEVICES TO CONTROL A PROCESSOR

(75) Inventors: Prasanna M. Shah, Sunnyvale; Robert L. Taber, Santa Clara; Herbert J. Kniess, San Jose, all of CA (US)

(73) Assignee: Pragmatic Communications Systems, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,938
(22) Filed: Apr. 28, 1998
(51) Int. Cl.$^7$ .................................................. G09G 5/00
(52) U.S. Cl. ........................ 345/156; 345/158; 345/161; 345/168; 345/169
(58) Field of Search ................................ 345/156, 157, 345/158, 161, 163, 168, 169; 361/679–683

(56) References Cited

U.S. PATENT DOCUMENTS

| 4,306,232 A | * | 12/1981 | Burson | 345/161 |
|---|---|---|---|---|
| 4,754,268 A | | 6/1988 | Mori | |
| 4,917,516 A | | 4/1990 | Retter | |
| 5,189,543 A | | 2/1993 | Lin et al. | |
| 5,305,449 A | | 4/1994 | Ulenas | |
| 5,406,273 A | | 4/1995 | Nishida et al. | |
| 5,650,831 A | * | 7/1997 | Farwell | 348/734 |
| 5,903,259 A | * | 5/1999 | Brusky et al. | 345/168 |
| 5,949,401 A | * | 9/1999 | Kazarian | 345/156 |
| 5,990,868 A | * | 11/1999 | Frederick | 345/158 |

* cited by examiner

Primary Examiner—Almis R. Jankus
Assistant Examiner—Amr Awad
(74) Attorney, Agent, or Firm—Sawyer Law Group LLP

(57) ABSTRACT

A wireless interface system comprising a set of input ports for keyboard, pointing device, and joystick signals, a data encoding circuit, a transmission unit, a receiving unit, a data decoding circuit, a keyboard data multiplexer unit, a pointing device data multiplexer unit, a joystick signal multiplexer unit, and a set of output interfaces for connecting to the corresponding computer ports. This system allows for the user to have a keyboard, pointing device, and joystick remotely located from the computer, and each input device shares a single wireless communication link to send its data to the computer.

16 Claims, 3 Drawing Sheets

WIRELESS INTERFACE SYSTEM FOR ALLOWING A PLURALITY OF INPUT DEVICES TO CONTROL A PROCESSOR

FIELD OF THE INVENTION

The present invention relates generally to computer interface circuits, and more specifically to a wireless interface system using a plurality of remote input devices to control a computer.

BACKGROUND OF THE INVENTION

Present-day computers commonly utilize a plurality of input devices with a keyboard, a pointing device such as a mouse, and in many cases, a joystick to control their operation. These input devices are usually located in close proximity to the computer and are connected to the computer by cables. There are certain applications where it is advantageous to have the keyboard, pointing device, and joystick located remotely at a substantial distance from the computer. In such cases it may be difficult, impractical, or undesirable to connect the remotely located devices by cables. To overcome these difficulties, several types of wireless keyboards have been made, and several types of wireless pointing devices have been made.

For example, U.S. Pat. No. 4,754,268 by Mori (1988) describes a wireless mouse apparatus. This apparatus includes a transmitter for sending the data from the mouse to the receiver connected to the computer.

U.S. Pat. No. 4,917,516 by Retter (1990) describes a combination keyboard and mouse data entry system where the mouse is physically a part of the keyboard unit. This device sends two independent data streams to the computer over two separate data cables.

U.S. Pat. No. 5,189,543 by Lin, et. al. (1993) describes an infra-red wireless keyboard system.

U.S. Pat. No. 5,305,449 by Ulenas (1994) describes a keycode/pointing device conversion adapter which converts mouse motion signals into cursor signals by activating keyboard cursor keys. This device allows for the use of the pointing device through the normal keyboard cable and keyboard interface port of the computer. However, because this device converts the pointing device motion signals into keyboard cursor signals, it is not possible to separate out the pointing device motion signals from the true keyboard cursor signals once they reach the computer, and no attempt is made to do so. This has a great disadvantage because most computer software either will not operate at all, or will operate with greatly reduced functionality if the pointing device commands are given by keyboard cursor signals instead of directly by the pointing device motion signals. This conversion adapter does not allow for the pointing device motion signals to be delivered to the pointing device input port of the computer in an unmodified form.

U.S. Pat. No. 5,406,273 by Nishida, et al. (1995) describes an apparatus which includes both a keyboard hardwired to the data processing system and a second keyboard connected via a wireless link.

There are numerous infra-red wireless joystick devices commercially available today, such as the VictorMaxx VIR one. All of the known conventional systems only provide for the operation of a single input device, and have not provided for the operation of two or more wireless input devices.

OBJECTS AND ADVANTAGES

Accordingly, several objects and advantages of the present invention are:

(a) to provide a wireless interface system which will accept inputs from a keyboard, a pointing device, and a joystick, either separately or in combination;

(b) to provide an apparatus to encode the data from the input devices and deliver the encoded data to the transmitter;

(c) to provide a single wireless communication link comprising a transmitter and a companion receiver, which is capable of sending the data from the encoding apparatus, and receiving the data that has been transmitted, thus allowing the communication link to be shared by two or more input devices;

(d) to provide an apparatus to decode the data from the receiver, such that the decoding apparatus is able to determine the source of the data from the remote input device;

(e) to provide a set of data multiplexer units to take the data from the data decoding apparatus and multiplex it with like data coming from a set of local input devices;

(f) to provide a suitable set of output interfaces to take the data from the multiplexer units and couple the data to the computer in a manner appropriate for the computer input ports;

(g) to provide a method whereby the keyboard data which originates with the remote keyboard is delivered to the keyboard input port of the computer in an unmodified form;

(h) to provide a method whereby the pointing device data which originates with the remote pointing device is delivered to the pointing device input port of the computer in an unmodified form; and (i) to provide a method whereby the joystick signals which originate with the remote joystick are delivered to the joystick input port (more commonly called the game port) of the computer in an unmodified form.

Further objects and advantages are to provide a single wireless communication link which is lighter in weight, less costly to produce, and consumes less electrical power than an approach based on using a multiplicity of transmitters and receivers, where each input device uses its own individual transmitter and receiver for its communication to the computer.

Still further objects and advantages are to provide a method to allow multiple remotely located input devices, each with its own transmitter, to share a single frequency and to share a single receiver, so that each remotely located device is able to send information to the receiver in a time division multiplexed manner.

Still further objects and advantages are to provide a wireless communication link based on using a single transmitter so that any degradation in performance caused by interference from a multiplicity of transmitters is avoided. Still further objects and advantages will become apparent from a consideration of the ensuing description and drawings.

The present invention addresses these objects and advantages.

SUMMARY OF THE INVENTION

A method and system for a wireless interface system is disclosed. The wireless interface system comprises a plurality of input ports for coupling data from a plurality of input devices and an encoder means for encoding said data from said input ports. The interface system further includes a transmitter means for transmitting a set of signals corresponding to the result of said encoding means and a receiver means for receiving said set of signals from said transmitting means. The interface system further includes a decoder means for decoding data from said receiving means and a plurality of output interfaces for coupling the output of said decoder means to a plurality of computer input ports. Each of said output interfaces corresponds to a computer input port of like type. The said plurality of input devices share a single wireless communication link to provide said data to said computer input ports. A system in accordance with the present invention allows for a user to have a keyboard, pointing device and joystick device remotely located from a computer and still share a single wireless communication link to send its data to the computer.

REFERENCE NUMERALS IN DRAWINGS

Figure 1:
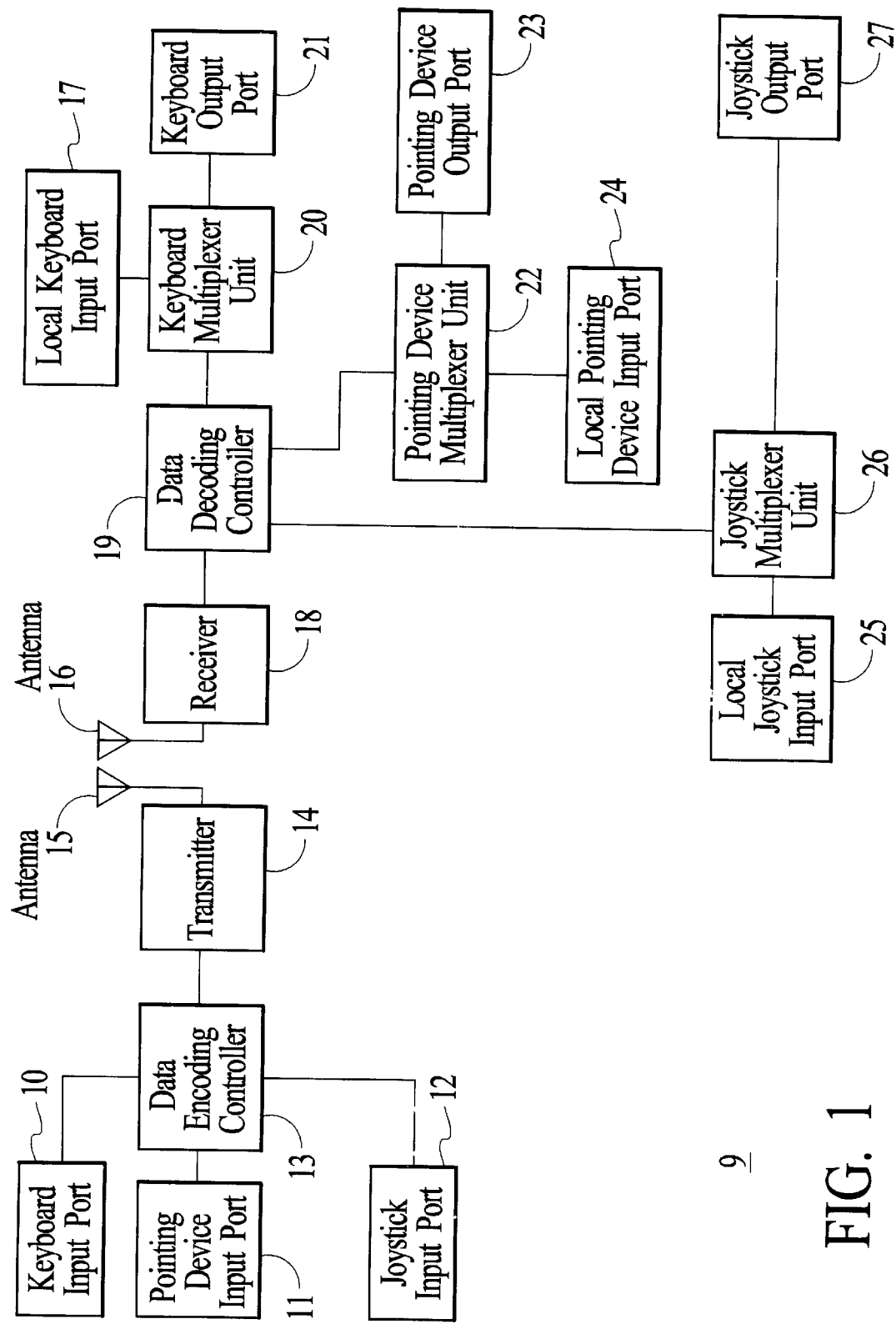
FIG. 1 is a block diagram showing the architecture of the system.

9 Wireless interface system
10 Keyboard input port
11 Pointing device input port
12 Joystick input port
13 Data encoding controller
14 Transmitter
15 Antenna
16 Antenna
17 Local keyboard input port
18 Receiver
19 Data decoding controller
20 Keyboard multiplexer unit
21 Keyboard output port
22 Pointing device multiplexer unit
23 Pointing device output port
24 Local pointing device input port
25 Local joystick input port
26 Joystick multiplexer unit
27 Joystick output port
28 Keyboard input port
29 Pointing device input port
30 Joystick input port
31 Data encoding controller
32 Transmitter
33 Antenna

DETAILED DESCRIPTION OF THE INVENTION

The present invention relates to a wireless interface system that uses a plurality of input devices to control a computer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

FIG. 1 shows the architecture of this wireless interface system 9, and how the various blocks, or modules are connected together. Each of these modules is described in turn, beginning with the modules at the left side of FIG. 1, and proceeding to the right.

A keyboard input port 10 provides an interface for a conventional computer keyboard (not shown), and allows for the keyboard data to be sent to a data encoding controller 13. Typically, keyboard input port 10 will be comprised of a physical interface in the form of an appropriate connector, an electrical interface in the form of appropriate voltage and signal levels at the appropriate pins of the connector, and a logical interface so that data encoding controller 13 is able to properly accept the data from the keyboard. The signals from the keyboard comprising a clock signal and a data signal.

A pointing device input port 11 provides an interface for a conventional computer pointing device (not shown) such as a mouse, trackball, or equivalent, and allows for the pointing device data to be sent to data encoding controller 13. The pointing device data signal comprising a conventional asynchronous serial data stream, nominally conforming to RS-232C signal levels. The pointing device interface will typically comprising a set of power signals, a data signal, and one or more control signals.

A joystick input port 12 provides an interface for a conventional computer joystick (not shown), and allows for the joystick signals to be sent to data encoding controller 13. The joystick signals comprising two analog signals for the X-Y porition indication, and a set of digital signals for the button state information.

Data encoding controller 13 includes circuitry to accept the data from the three input ports, keyboard input port 10, pointing device input port 11, and joystick input port 12, and prepare and encode the data. The encoding process includes adding information to identify which input device generated the data, preparing the data for transmission, and sending the encoded data to a transmitter 14.

Data encoding controller 13 may be constructed using a conventional single-chip microcontroller or equivalent circuitry. A single-chip microcontroller contains sufficient input-output ports, sufficient logic, and sufficient memory resources to accomplish the encoding process described herein.

The encoding process may also include adding information to identify which data encoding controller is encoding the data, adding information for error detection or error correction, and adding other information as may be desirable for synchronization, transmission, or data encoding.

Transmitter 14 includes circuitry to use the data from data encoding controller 13 to modulate a carrier and transmit the modulated carrier through an antenna 15. The modulated carrier is propagated wirelessly from antenna 15 to antenna 16.

A receiver 18 includes circuitry to receive the modulated carrier from antenna 16 and demodulate the data from the carrier and output the demodulated data to a data decoding controller 19.

Data decoding controller 19 includes circuitry to decode the demodulated data from receiver 18, determine the source of the data, and direct the data to one of three multiplexer units, either keyboard multiplexer unit 20, pointing device multiplexer unit 22, or joystick multiplexer unit 26. Data decoding controller 19 may be constructed using a conventional single-chip microcontroller or equivalent circuitry. Data decoding controller 19 may also include circuitry to control each of the three multiplexer units. The control signal selects which of the two data sources is the active data source. Thus, data decoding controller 19 supplies both a data signal and a control signal to each of the three multiplexer units.

A local keyboard input port 17 provides an interface for a conventional computer keyboard (not shown), and allows for the data from the local keyboard to be sent to keyboard multiplexer unit 20.

Keyboard multiplexer unit 20 includes circuitry to accept two data sources, the first data source from data decoding controller 19, and the second data source from local keyboard input port 17. Keyboard multiplexer unit 20 is controlled by data decoding controller 19 to select which is the active data source. The data from the active data source is sent to a keyboard output port 21.

A local pointing device input port 24 provides an interface for a conventional computer pointing device (not shown) such as a mouse, trackball, or equivalent, and allows for the data from the local pointing device to be sent to pointing device multiplexer unit 22.

Pointing device multiplexer unit 22 includes circuitry to accept two data sources, the first data source from data decoding controller 19, and the second data source from a local pointing device input port 24. Pointing device multiplexer unit 22 is controlled by data decoding controller 19 to select which is the active data source. The data from the active data source is sent to a pointing device output port 23.

A local joystick input port 25 provides an interface for a conventional computer joystick (not shown), and allows for the signals from the local joystick to be sent to joystick multiplexer unit 26.

Joystick multiplexer unit 26 includes circuitry to accept two data sources, the first data source from data decoding controller 19, and the second data source from a local joystick input port 25. Joystick multiplexer unit 26 is controlled by data decoding controller 19 to select which is the active data source. The data from the active data source is sent to a joystick output port 27.

Keyboard output port 21 provides an interface to couple the keyboard data into the keyboard input port of the computer (not shown). Pointing device output port 23 provides an interface to couple the pointing device data into the pointing device input port of the computer (not shown). Joystick output port 27 provides an interface to couple the joystick signals into the joystick input port of the computer (not shown).

Figure 2:
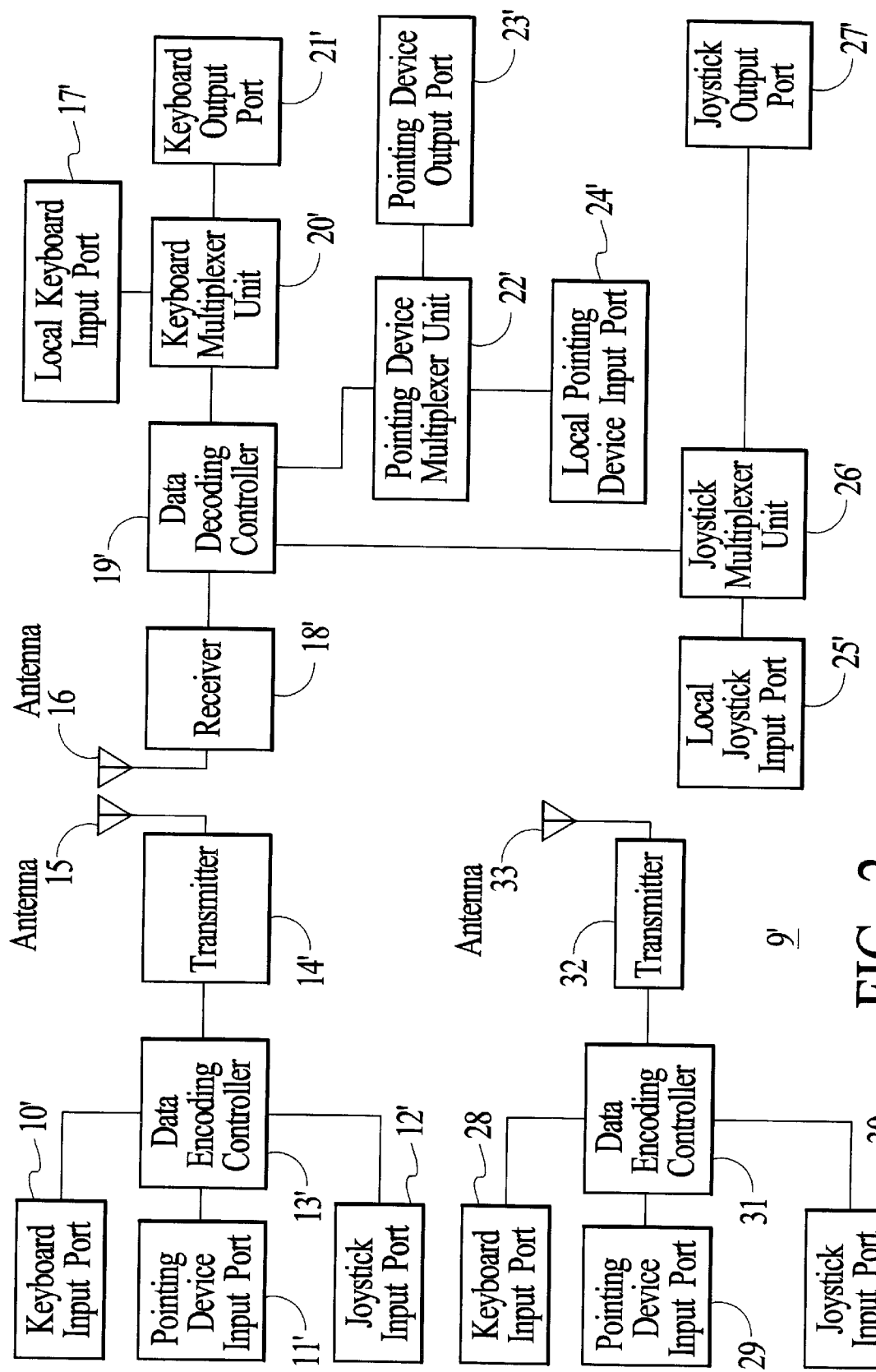
FIG. 2 shows an example of an expanded system with two transmitters.

FIG. 2 shows an example of an expanded system 9' which includes all of the elements shown in FIG. 1, plus the additional elements described next. A keyboard input port 28 provides an interface for a conventional computer keyboard (not shown), and allows for the keyboard data to be sent to a data encoding controller 31. A pointing device input port 29 provides an interface for a conventional computer pointing device (not shown) such as a mouse, trackball, or equivalent, and allows for the pointing device data to be sent to data encoding controller 31.

A joystick input port 30 provides an interface for a conventional computer joystick (not shown), and allows for the joystick signals to be sent to data encoding controller 31.

Data encoding controller 31 includes circuitry to accept the data from the three input ports, keyboard input port 28, pointing device input port 29, and joystick input port 30, and prepare and encode the data. The encoding process includes adding information to identify which input device generated the data, preparing the data for transmission, and sending the encoded data to a transmitter 32.

Transmitter 32 includes circuitry to use the data from data encoding controller 31 to modulate a carrier and transmit the modulated carrier through an antenna 33. The modulated carrier is propagated wirelessly from antenna 33 to antenna 16.

OPERATION—FIGS. 1 TO 3

Figure 3:
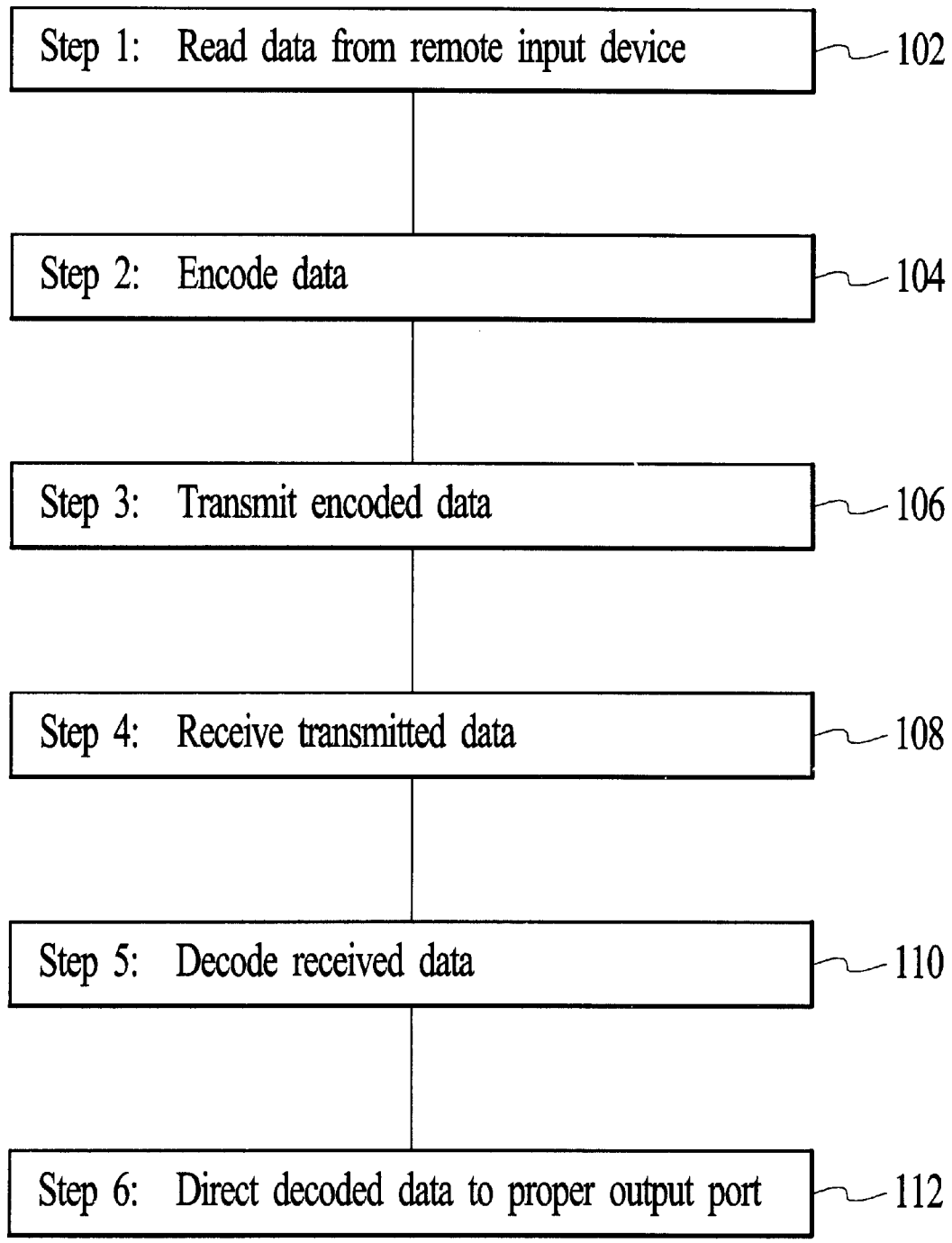
FIG. 3 is a flow chart showing the steps involved in communicating data from a remote input device to the computer.

Consider what happens when the user presses a key on a remote keyboard which is connected to keyboard input port 10 of the wireless interface system as shown in FIG. 1, and the flow chart of FIG. 3. The data from a wireless keyboard (not shown) is passed to data encoding controller 13 through keyboard input port, 10 via step 102. Data encoding controller 13 prepares the data for transmission and passes the data to transmitter 14, via step 104. Transmitter 14 applies a modulation, via step 106, to a carrier signal so that the resulting modulated carrier is transmitted wirelessly to receiver 18, via step 108. Receiver 18 demodulates the carrier, extracts the encoded data from the carrier, and sends the extracted data to data decoding controller 19, via step 110. Data decoding controller 19 analyzes the data given to it from receiver 18, and determines that the data originated from the remote keyboard. Data decoding controller 19 then configures keyboard multiplexer unit 20 to the state where it will pass the data from data decoding controller 19 to the computer. Data decoding controller 19 then sends the data through keyboard multiplexer unit 20 and through keyboard output port 21, via step 112 so that the data is received by the computer at the keyboard input port of the computer. The result of this operation is that the keyboard data which originated from the remote keyboard has been transferred to the keyboard input port of the computer in an unmodified form.

A second series of operations occurs when the user "moves the mouse" or performs any other action with the remote pointing device. The data from the pointing device is passed to data encoding controller 13 through pointing device input port 11. Data encoding controller 13 prepares the data for transmission and passes the data to transmitter 14. Transmitter 14 modulates a carrier so that the resulting modulated carrier is transmitted wirelessly to receiver 18. Receiver 18 demodulates the carrier, extracts the encoded data from the carrier, and sends the extracted data to data decoding controller 19. Data decoding controller 19 analyzes the data given to it from receiver 18, and determines that the data originated from the remote pointing device. Data decoding controller 19 then configures pointing device multiplexer unit 22 to the state where it will pass the data from data decoding controller 19 to the computer. Data decoding controller 19 then sends the data through pointing device multiplexer unit 22 and through pointing device output port 23 so that the data is received by the computer at the pointing device input port of the computer. The result of this operation is that the pointing device data which originated from the remote pointing device has been transferred to the pointing device input port of the computer in an unmodified form.

A further series of operations occurs when the user "moves the joystick" or performs any other action with the remote joystick. The data from the joystick is passed to data encoding controller 13 through joystick input port 12. Data encoding controller 13 prepares the data for transmission and passes the data to transmitter 14. Transmitter 14 modulates a carrier so that the resulting modulated carrier is transmitted wirelessly to receiver 18. Receiver 18 demodulates the carrier, extracts the encoded data from the carrier, and sends the extracted data to data decoding controller 19.

Data decoding controller 19 analyzes the data given to it from receiver 18, and determines that the data originated from the remote joystick. Data decoding controller 19 then configures joystick multiplexer unit 26 to the state where it will pass the data from data decoding controller 19 to the computer. Data decoding controller 19 then sends the data through joystick multiplexer unit 26 and through joystick output port 27 so that the data is received by the computer at the joystick input port of the computer. The result of this operation is that the joystick data which originated from the remote joystick has been transferred to the joystick input port of the computer in an unmodified form.

A further series of operations occurs when the user presses a key on the local keyboard. Data decoding controller 19 will normally keep keyboard multiplexer unit 20 configured so that the active input is from local keyboard input port 17. In this way, when the user presses a key on the local keyboard, the keyboard data is passed through keyboard multiplexer unit 20 and through keyboard output port 21 so that the data is received by the computer at the keyboard input port of the computer.

A further series of operations occurs when the user moves or activates the local pointing device. Data decoding controller 19 will normally keep pointing device multiplexer unit 22 configured so that the active input is from local pointing device input port 24. In this way, when the user moves the mouse or other local pointing device, the pointing device data is passed through pointing device multiplexer unit 22 and through pointing device output port 23 so that the data is received by the computer at the pointing device input port of the computer.

A further series of operations occurs when the user moves the local joystick. Data decoding controller 19 will normally keep joystick multiplexer unit 26 configured so that the active input is from local joystick input port 25. In this way, when the user moves the local joystick, the joystick signals are passed through joystick multiplexer unit 26 and through joystick output port 27 so that the signals are received by the computer at the joystick input port of the computer.

A further series of operations occurs in the case where there are multiple remotely located sets of input devices, each set with its own transmitter, as shown in FIG. 2. Each set of input devices may include a keyboard, pointing device, and joystick, so that the entire system would include remote keyboards, multiple remote pointing devices, and multiple remote joysticks. Because each transmitter uses a discontinuous method of transmission, there is no carrier emitted from an unused transmitter. This allows for a different transmitter to share the same frequency and to share the same receiver as the unused transmitter. The result of this operation is that the user is able to easily send information from one remotely located input device to the computer, without the user taking any special action such as requiring that the unused transmitter be switched off.

For example, still referring to FIG. 2, when the user presses a key on the remote keyboard which is connected to keyboard input port 10, then the resulting keyboard data is transmitted by transmitter 14 to receiver 18. When the user presses a key on the remote keyboard which is connected to keyboard input port 28, then the resulting keyboard data is transmitted by transmitter 32 to receiver 18. Receiver 18 is able to accept signals from either transmitter 14 or transmitter 32 because both transmitters are configured to use the same frequency. The two transmitters do not interfere with one another because the unused transmitter is automatically disabled from sending a carrier after the completion of any transmission.

Accordingly, it is seen that the wireless interface system of this invention allows for the user to have a keyboard, pointing device, and joystick remotely located from the computer, and each input device shares a single wireless communication link to send its data to the computer.

The description provided above contains several elements which are optional and are intended to enhance this wireless interface system, but these elements are not required for the successful operation of the system. In particular, the keyboard multiplexer, the pointing device multiplexer, and the joystick multiplexer are all optional elements which may be present in the preferred embodiment of this invention, but may be omitted in other embodiments of this invention.

There are a wide variety of modulation methods available for the transmitter to modulate a carrier to send the data. For example, modulation methods such as Amplitude-Shift-Keying, Frequency-Shift-Keying, Bi-Phase-Shift-Keying, Quadrature-Phase-Shift-Keying, Pulse-Width-Modulation, Pulse-Position-Modulation, or other modulation methods may be employed. The type of modulation method employed is not important to this invention, so long as the receiver is able to properly demodulate the data signal from the carrier.

Although the preferred embodiment of this invention may include a transmitter which uses radio frequency signals as its method of wireless communication, other embodiments of this invention may include other methods of wireless or wired communication, such as infra-red, near-field inductive, acoustic, fiber-optic, conductive cables, or similar methods.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A wireless interface system comprising:

a plurality of input ports for coupling data from a plurality of input devices;

an encoder means for encoding said data from said input ports;

a transmitter means for transmitting a set of signals corresponding to the result of said encoding means;

a receiver means for receiving said set of signals from said transmitting means;

a decoder means for decoding data from said receiving means;

a multiplexer means for multiplexing the plurality of input devices with at least one local input device;

a plurality of output interfaces for coupling the output of said decoder means to a plurality of computer input ports, each of said output interfaces corresponding to a computer input port of like type, wherein said plurality of input devices share a single wireless communication link to provide said data to said computer input ports wherein the multiplexer means is coupled with at least one output interface of the decoder means; and wherein at least one output interface of the plurality of output interfaces couples the output of the decoder means to at least one computer input port of the plurality of computer input ports when the multiplexer means selects the decoder means for output and wherein the at least one output interface couples the at least one local input device with the at least one computer input port when the multiplexer means selects the local input device for output.

2. The system of claim 1 in which the input devices include a plurality of keyboard data sources.

3. The system of claim 2, wherein the multiplexer means further including a keyboard multiplexer means for multiplexing the plurality of keyboard data sources.

4. The system of claim 1 in which the input devices include a plurality of pointing device data sources.

5. The system of claim 4, wherein the multiplexer means further including a pointing device multiplexer means for multiplexing the plurality of pointing device data sources.

6. The system of claim 1 in which the input devices include a plurality of joystick signal sources.

7. The system of claim 6, wherein the multiplexer means further including a joystick multiplexer means for multiplexing a plurality of joystick signal sources.

8. A method for sharing a single wireless communication link by a plurality of remotely located input devices of known type, comprising the steps of:

(a) reading a set of data generated by said input devices;

(b) encoding said data with information to identify which of said input devices said data was generated by;

(c) transmitting said encoded data by said single wireless communication link to a receiving means, said receiving means producing received data from said wireless communications link;

(d) decoding said received data to determine which of said input devices generated said received data;

(e) providing the decoded data to a multiplexer means capable of being coupled with at least one local input;

(f) directing said decoded data to one of a plurality of output ports for coupling to a computer input port corresponding to the type of said decoded data if the multiplexer means selects the decoder means for output, wherein said data which originates with the remotely located input device is delivered to said input port of the computer in an unmodified form; and (g) directing the at least one local input device to the at least one computer input port when the multiplexer means selects the local input device for output.

9. A method for sharing a single wireless communication link by a plurality of remotely located input devices of known type, comprising the steps of:

(a) reading a set of data generated by said plurality of input devices (b) encoding said data with information to identify which of said input devices generate said data;

(c) transmitting said encoded data by said single wireless communication link from a transmitting means to a receiving means, said receiving means producing received data from said wireless communications link;

(e) disabling said transmitting means after the completion of transmitting said encoded data, thereby preventing said transmitting means from emitting a carrier signal during an idle time period and allowing a plurality of transmitting means to share a single frequency and to share said receiving means;

(f) decoding said received data to determine which of said input devices generated said received data;

g) providing the decoded data to a multiplexer means capable of being coupled with at least one local input;

(h) directing said decoded data to one of a plurality of output ports for coupling to a computer input port corresponding to the type of said decoded data if the multiplexer when the multiplexer means selects the decoder means for output, whereby said data which originates with the remotely located input device is delivered to said input port of the computer in an unmodified form; and (h) directing the at least one local input device to the at least one computer input port when the multiplexer means selects the local input device for output.

10. An interface system for allowing a plurality of wireless remote input devices to control a processor comprising:

a plurality of input ports, each of the plurality of input ports capable of receiving data from one of plurality of the input devices an encoder for encoding the data received from the plurality of input ports;

a decoder means for receiving the encoded data and decoding the encoded data;

a multiplexer means for multiplexing the plurality of input devices with at least one local input device;

a plurality of output interfaces for coupling the output of said decoder means to a plurality of computer input ports, each of said output interfaces corresponding to a computer input port of like type, wherein said plurality of input devices share a single wireless communication link to provide said data to said computer input ports wherein the multiplexer means is coupled with at least one output interface of and the decoder means; and wherein at least one output interface of the plurality of output interfaces couples the output of the decoder means to at least one computer input port of the plurality of computer input ports when the multiplexer means selects the decoder means for output and wherein the at least one output interface couples the at least one local input device with the at least one computer input port when the multiplexer means selects the local input device for output.

11. The system of claim 10 in which the input devices include a plurality of keyboard data sources.

12. The system of claim 11, wherein the multiplexer means further including a keyboard multiplexer means for multiplexing the plurality of keyboard data sources.

13. The system of claim 10 in which the input devices include a plurality of pointing device data sources.

14. The system of claim 13, further including a pointing device multiplexer means for multiplexing the plurality of pointing device data sources.

15. The system of claim 10 in which the input devices include a plurality of joystick signal sources.

16. The system of claim 15, further including a joystick multiplexer means for multiplexing a plurality of joystick signal sources.

* * * * *